United States Patent [19]
Hicks

[11] Patent Number: 5,707,281
[45] Date of Patent: Jan. 13, 1998

[54] GAME CARCASS SPREADER

[76] Inventor: Garry Edward Hicks, 5736 Judie Ct., Ft. Worth, Tex. 76148

[21] Appl. No.: 761,613

[22] Filed: Dec. 6, 1996

[51] Int. Cl.$^6$ ............................................. A22B 5/06
[52] U.S. Cl. ........................................................ 452/197
[58] Field of Search .............................. 452/197, 191, 452/189

[56] References Cited

U.S. PATENT DOCUMENTS

| | | | |
|---|---|---|---|
| 12,222 | 1/1855 | Tesh | 452/197 |
| 370,615 | 9/1887 | Folger | 452/197 |
| 521,774 | 6/1894 | Perl | 452/191 |
| 1,107,110 | 8/1914 | Priem | 452/189 |
| 2,747,321 | 1/1956 | Thompson | 452/197 |
| 4,909,555 | 3/1990 | Blasi | 452/189 |
| 5,343,624 | 9/1994 | Symons | 33/810 |
| 5,360,368 | 11/1994 | Hajek | 452/197 |

FOREIGN PATENT DOCUMENTS 14312  7/1881  Germany ............................. 452/197

*Primary Examiner*—Willis Little
*Attorney, Agent, or Firm*—Joseph H. McGlynn Patent & Trademark Services, Inc.

[57] ABSTRACT

An improved animal carcass spreader which comprises a crossbar with spreader arms mounted thereon. The spreader arms are curvilinear members having end portions with spikes mounted thereon for spreading the ribs of an animal. One of the spreader arms is fixedly mounted at the distal end of the crossbar, while the opposing spreader arm is slidably mounted. The slidable spreader arm is provided with a handle and a ratchet lever. The ratchet lever permits travel of the slidable spreader arm only in a direction away from the fixed spreader arm unless said ratchet lever is manually disengaged by squeezing the ratchet lever towards the handle and a raised stopper is provided to prevent the ratchet lever from sliding completely off the crossbar.

11 Claims, 1 Drawing Sheet

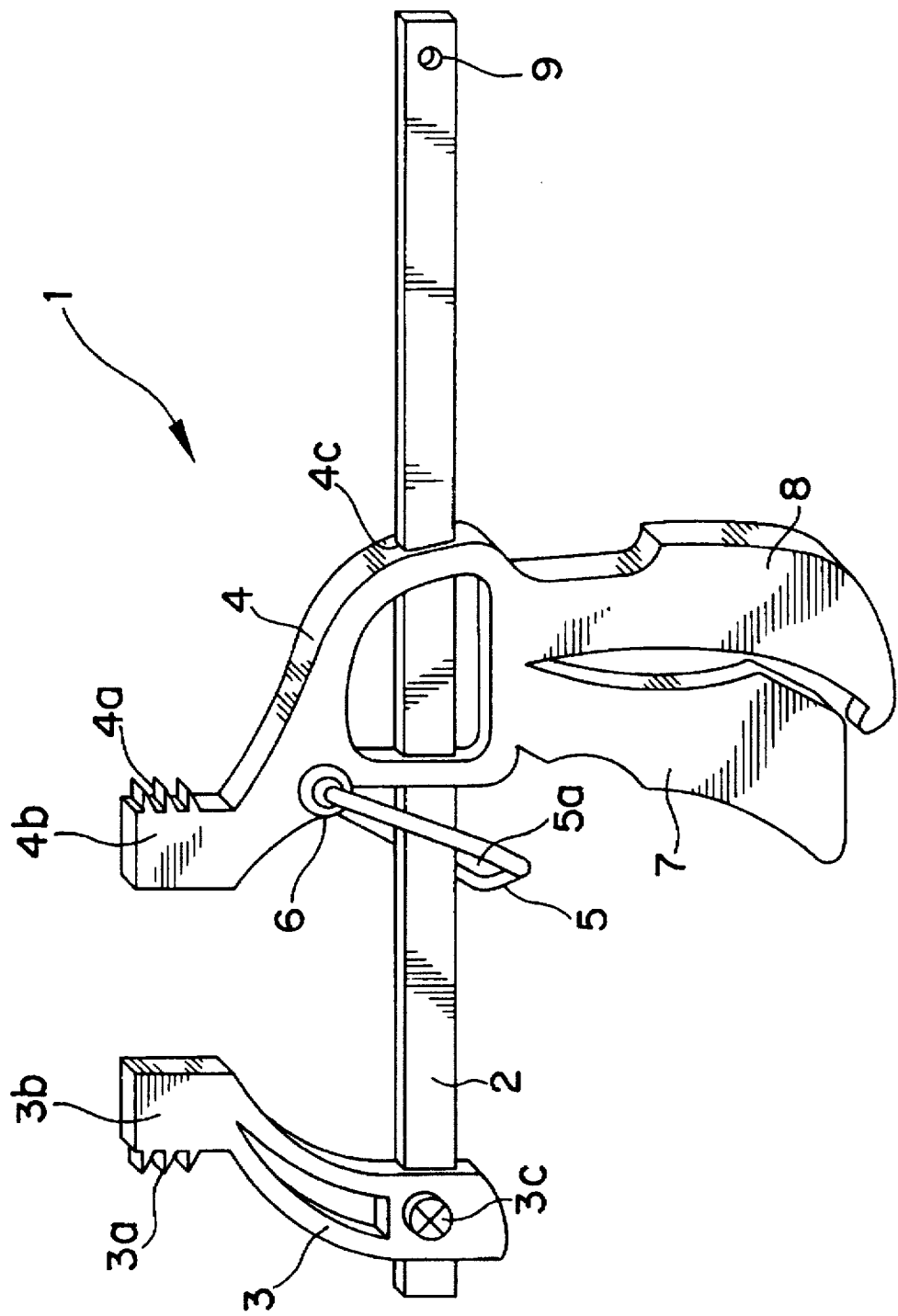

GAME CARCASS SPREADER

BACKGROUND OF THE INVENTION

The present invention relates generally to devices for holding open the carcass of an animal, and in particular to an adjustable game carcass spreader used to facilitate the processes of field dressing, butchering, and cooling of game animals.

Description of the Prior Art

After a game animal has been taken in the field, the first task which must be completed is to field dress the animal. The internal organs must be removed quickly to facilitate transporting the animal and to preserve the meat. This task is frequently difficult, however, because the ribs of the animal curve inward toward its abdomen, providing only a very small opening from which to remove the innards. The ribs must therefore be spread apart, which is difficult to do without an extra set of hands. Hunters in the field often find themselves in a very messy and difficult procedure if they do not have the aid of companions to assist them. It is also desirable to spread the ribs of the animal for cooling, drying, and butchering the meat.

Several devices for spreading carcasses have been disclosed in the prior art. U.S. Pat. No. 5,360,368 describes a tool for spreading the ribs of a deer or other game animal, comprising outwardly spaced hooks connected by a coupling. This device, however, is not readily adjustable to fit different size carcasses. Additionally, it must be disassembled and removed from the animal before it can be applied at different points along the animal's ribcage.

U.S. Pat. No. 12,222 describes a spreader primarily for use on pre-dressed beef carcasses. The invention comprises a crank which may be turned to extend the length of a spreading member. This invention is very cumbersome, having complicated parts which render it unsuitable for use in the field. The crank would become soiled and gummed up by the innards of the animal, and the invention would be extremely bulky to transport.

U.S. Pat. No. 370,615 discloses a meat spreader comprising two pivotally connected arm members which can be attached along a series of openings to provide different lengths. This device is unsuitable for use in the field because it is cumbersome to adjust, and also because it requires the user to exert a great deal of force to insert it between the ribs of the animal. Use of this device on undressed game animals would be both messy and difficult.

U.S. Pat. No. 2,747,321 describes a hand-held spreader for a fish mouth, comprising pivotally attached spreading levers and a ratchet bar. This device cannot provide the leverage or the spreading distance needed for properly spreading the ribs of a large game animal. If the invention were sized to fit game animals, it would be so large and cumbersome as to preclude its use in the field.

Thus, the prior art has not disclosed a game carcass spreader which provides the convenience, simplicity, and versatility desired by hunting enthusiasts. There remains a need for a game carcass spreader that is readily adjustable to fit various size animals, and which can be used with a minimum of effort and mess. The present invention provides a game spreader which eliminates the disadvantages encountered with the prior art devices, and provides an inexpensive, lightweight, and easy-to-use game spreader suitable for use in the field.

SUMMARY OF THE INVENTION

The present invention is a rib spreader for use on game animals and the like. The invention comprises spreading arms attached to a crossbar. The spreading arms are curved members with rib-engaging end portions, forming a generally U-shaped configuration extending normally from the crossbar. One of these arms is fixedly mounted at one end of the crossbar, while the other is slidably mounted thereon. The slidable spreader arm has a handle which may be grasped to move the arm along the crossbar. Further provided on the slidable spreader arm is a pivotally mounted ratchet lever which locks in place when released. The ratchet lever permits movement of the slidable spreader arm away from, but not towards, the stationary arm.

After an animal has been taken in the field and opened for dressing, the end portions of the spreader arms are inserted into the space between the animal's rib ends. The slidable arm is then pulled away from the stationary arm along the crossbar, spreading the animal's rib cage. The ratchet lever keeps the spreader in the "open" position until it is disengaged. The spreader thus can be easily moved from one point along the ribcage to another without cumbersome disassembly. The invention may be used to spread the ribs of an animal for field dressing, cooling, and curing the carcass. It can be applied to many different sizes of animals, and may be easily carried, cleaned, and stored.

Accordingly, it is an object of the present invention to provide an improved animal carcass spreader.

It is a further object of this invention to provide a carcass spreader which is inexpensive, lightweight, and simple to use.

It is a further object of this invention to provide a carcass spreader that may be used in the field with a minimum of effort and mess.

It is a further object of this invention to provide a carcass spreader that is readily adjustable, to fit many different size animals and to provide for movement to different points along the animal's ribcage.

These and other objects and advantages of the present invention will become readily apparent from the detailed description below, when taken in conjunction with the annexed drawings.

BRIEF DESCRIPTION OF THE DRAWINGS

FIG. 1 shows a perspective view of the present invention.

DESCRIPTION OF THE PREFERRED EMBODIMENT

Referring now to the drawings in greater detail, the carcass spreader of the present invention 1 is seen in FIG. 1 comprising a crossbar 2, a stationary spreader arm 3, and a slidable spreader arm 4. The spreader arms 3, 4 are generally curvilinear members having end portions 3b, 4b generally normal to the longitudinal axis of the crossbar 2. Spiked protrusions 3a, 4a extend outward from the end portions 3b, 4b.

The stationary spreader arm 3 is fixedly mounted at the distal end of the crossbar 2 by any suitable means. Although the means of attachment shown is a screw or bolt 3c, the crossbar 2 and the stationary spreader arm 3 could, for example, be molded as a single piece without departing from the scope of the invention.

A slidable spreader arm 4 is mounted opposite the stationary spreader arm 3 on the crossbar 2, said slidable spreader arm having an opening 4c for receiving the crossbar 2. The slidable spreader arm 4 have handles 7, 8 mounted on the side of the crossbar opposite that of the end portion 4b. The handle 7 is preferably shaped to contour to a person's fingers.

A ratchet lever 5 is pivotally mounted at 6 to the slidable spreader arm 4. The ratchet lever 5 is also slidably mounted on the crossbar 2 by means of an opening 5a which receives the crossbar 2. The ratchet lever 5 is mounted at a slight angle relative to the crossbar 2, so as to lock in position when released. The ratchet arm 5, as shown in FIG. 1 is in the release position and is not engaging the crossbar 2. In this position it slides over the crossbar 2 as the slidable spreader arm 4 is pulled away from the fixed spreader arm 3, but locks into position, by engaging the crossbar 2 when released, preventing movement of the slidable spreader arm 4 towards the fixed spreader arm 3. The ratchet lever 5 may be disengaged by squeezing the ratchet lever 5 towards the handle member 8, and simultaneously pushing the handle member 8 in the direction of the stationary spreader arm 3. The ratchet lever can be made from a resilient metal which will return to an engaged position with the crossbar 2 when it is released. In alternative, the ratchet lever could be made from a rigid metal or plastic and be moved into an engaged position by a spring.

To use the invention, the end portions 3b, 4b of the spreader arms 3, 4 are inserted between the rib ends of an animal to be field dressed. The handle member 7 is used to pull the slidable spreader arm 4 away from the fixed spreader arm 3. The end portions 3b, 4b thus push against the rib ends of the animal, forcing them apart. The spiked protrusions 3a, 4a provide traction on the rib ends of the animal by embedding therein, reducing the possibility of the spreader arms 3, 4 slipping away from the animal's ribcage. When the slidable spreader arm 4 is pulled to the desired location on the crossbar 2, the handle 7 may be released. The ribcage of the animal will remain in the spread position because the ratchet lever 5 engaging the crossbar 2 prevents the slidable spreader arm 4 from traveling in the direction of the fixed spreader arm 3. The ratchet lever 5 may be disengaged, as shown in FIG. 1, to allow free travel of the slidable spreader arm 4 by squeezing the ratchet lever 5 towards the handle member 7 and simultaneously pushing the handle member 8 towards the fixed spreader arm 3. A raised stopper 9 is provided on the crossbar 2 to prevent the slidable spreader arm 4 from slipping off the end of the crossbar 2.

The present invention thus provides a convenient, adjustable spreader capable of being used on many different sized animals. It is useful for the processes of field dressing, as well as for cooling and curing of meat. The invention may be inexpensively constructed using aluminum, hard plastic, or PVC. However, any lightweight, durable material may of course be used without departing from the scope of the invention.

Although the game carcass spreader and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. A game carcass spreader comprising:

a first rib-engaging means for spreading apart the ribcage of a large game animal;

a second rib-engaging means for spreading apart the ribcage of a large game animal;

means for slidably engaging said first and second rib-engaging means which comprises a bar having a length and a width and a top side and a bottom side;

means for holding said first rib-engaging means in a fixed position on said bar;

means for moving said second rib-engaging means along said bar in relationship to said first rib-engaging means;

means for holding said second rib-engaging means in a selected position with respect to said first rib-engaging means;

said first and second rib-engaging means are positioned adjacent said top side of said bar; and said means for holding said second rib-engaging means in a selected position with respect to said first rib-engaging means is attached to said means for moving said second rib-engaging means along said bar; and said means for holding said second rib-engaging means in a selected position comprises a first portion pivotably attached, to said means for moving said second rib-engaging means along said bar, above said top side of said bar, and a second portion which directly engages said bottom side of said bar when said means for holding said second rib-engaging means is in said selected position, whereby said second portion will frictionally engage said bottom side of said bar and prevent said second rib-engaging means from moving toward said first rib-engaging means.

2. The game carcass spreader as defined in claim 1, wherein said first rib-engaging means comprises a spreader arm which is fixedly attached to said means for slidably engaging said first and second rib-engaging means.

3. The game carcass spreader as defined in claim 1, wherein said second rib-engaging means is a spreader arm which is slidably attached to said means for slidably engaging said first and second rib-engaging means.

4. The game carcass spreader as defined in claim 1, wherein said means for slidably engaging said first and second rib-engaging means is a bar which is fixedly attached to said first rib-engaging means, and slidably attached to said second rib-engaging means.

5. The game carcass spreader as defined in claim 1, wherein said means for attaching said spreader arm is a bolt which is fixedly attached to said first rib-engaging means so as to pass through a bottom portion of said first rib-engaging means and to pass through said bar.

6. The game carcass spreader as defined in claim 1, wherein said second rib-engaging means is a spreader arm which has a hole through which said crossbar is slidably disposed.

7. The game carcass spreader as defined in claim 1, wherein said means for gripping said second rib-engaging means is a manually operable hand grip.

8. The game carcass spreader as defined in claim 1, wherein said means for varying the distance between said first and second rib-engaging means is a pivotally mounted ratchet lever which locks in place when released.

9. The game carcass spreader as defined in claim 1, wherein said means for providing traction on the ends of the first and second rib-engaging means is a plurality of spiked protrusion means for engaging the rib ends of a large game animal.

10. The game carcass spreader as defined in claim 1, wherein said first spreader arm is a unitary part of said crossbar.

11. The game carcass spreader as defined in claim 1, wherein the means for preventing said second rib-engaging means from sliding off the end of said bar is a raised stopper provided on both sides of said bar.

* * * * *